US011361328B2

(12) United States Patent
Thube

(10) Patent No.: US 11,361,328 B2
(45) Date of Patent: Jun. 14, 2022

(54) REDUCED NETWORK FOOTPRINT CUSTOMER BEHAVIOR ANALYTICS

(71) Applicant: International Business Machines Corporation, Armonk, NY (US)

(72) Inventor: Sandip Thube, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 753 days.

(21) Appl. No.: 15/460,201

(22) Filed: Mar. 15, 2017

(65) Prior Publication Data

US 2018/0268423 A1    Sep. 20, 2018

(51) Int. Cl.
*G06Q 30/00* (2012.01)
*G06Q 30/02* (2012.01)
(Continued)

(52) U.S. Cl.
CPC ......... *G06Q 30/0201* (2013.01); *G06F 3/048* (2013.01); *G06F 3/0481* (2013.01); *G06Q 30/0601* (2013.01)

(58) Field of Classification Search
CPC ............ G06Q 30/0201; G06Q 30/0601; G06F 3/0481; G06F 40/14; G06F 11/3438;
(Continued)

(56) References Cited

U.S. PATENT DOCUMENTS 8,489,605 B2 *    7/2013   Ayoub .................... G06F 17/30
                                                            707/737

8,533,532 B2 *    9/2013   Wenig ................. G06F 11/3495
                                                            714/33
(Continued)

FOREIGN PATENT DOCUMENTS

CA          2588219 A1 *   6/2006    ............. G06F 15/76

OTHER PUBLICATIONS

K. Pattabiraman and B. Zorn, "DoDOM: Leveraging DOM Invariants for Web 2.0 Application Robustness Testing," 2010 IEEE 21st International Symposium on Software Reliability Engineering, 2010, pp. 191-200 (Year: 2010).*

(Continued)

*Primary Examiner* — Hafiz A Kassim
*Assistant Examiner* — Tyrone E Singletary
(74) *Attorney, Agent, or Firm* — Peter J. Edwards

(57) ABSTRACT

Embodiments of the invention provide for reduced network footprint customer behavior analytics. In an embodiment of the invention, a method for reduced network footprint customer behavior analytics includes executing an analytics server in memory of a host computing system and loading into the memory a table. The table includes a multiplicity of entries, each entry correlating a reference to a DOM with a unique identifier and a Web browser brand. Thereafter, the analytics server performs DOM capture and replay of a Web site by receiving from over a computer communications network instead of a complete DOM, a message encapsulating both a unique identifier for a Web page of the site, and a Web browser brand rendering the page, identifying using the table a particular DOM referenced in correlation to the encapsulated identifier and browser brand, retrieving the particular DOM from a data store and performing replay utilizing the retrieved DOM.

15 Claims, 3 Drawing Sheets

(51) Int. Cl.
  *G06Q 30/06* (2012.01)
  *G06F 3/0481* (2022.01)
  *G06F 3/048* (2013.01)

(58) Field of Classification Search
  CPC .... G06F 9/451; G06F 11/302; G06F 11/3668; G06F 3/048
  USPC ...................................................... 705/7.29
  See application file for complete search history.

(56) References Cited

U.S. PATENT DOCUMENTS

| | | | |
|---|---|---|---|
| 8,572,479 B2 | 10/2013 | Sylthe | |
| 9,298,850 B2 | 3/2016 | Benjamin et al. | |
| 9,766,769 B1* | 9/2017 | Webber | G06F 9/451 |
| 10,083,159 B1* | 9/2018 | Bekmambetov | G06F 17/24 |
| 10,430,212 B1* | 10/2019 | Bekmambetov | G06F 3/14 |
| 2003/0051157 A1* | 3/2003 | Nguyen | H04L 63/04 |
| | | | 726/4 |
| 2010/0174774 A1* | 7/2010 | Kern | H04L 29/06 |
| | | | 709/203 |
| 2012/0173966 A1* | 7/2012 | Powell | G06Q 30/0241 |
| | | | 715/234 |
| 2013/0132833 A1* | 5/2013 | White | G06F 11/3438 |
| | | | 715/704 |
| 2014/0108911 A1* | 4/2014 | Damale | H04L 67/02 |
| | | | 715/234 |
| 2017/0063653 A1* | 3/2017 | Kieviet | H04L 67/02 |
| 2017/0323026 A1* | 11/2017 | Le Bras | G06F 40/143 |

OTHER PUBLICATIONS

Chakrabarti, S., "Integrating the Document Object Model with Hyperlinks for Enhanced . . . ," Indian Institute of Technology Bombay, May 2001, Hong Kong.

IBM, "System and Method to Reduce Application Footprint," ip.com, Mar. 2, 2009.

"HTML basics," MDN Web Docs, Printed Sep. 27, 2021, 1 page https://developer.mozilla.org/en-US/docs/Learn/Getting_started_with_the_web/HTML_basics.

"HTML," Merriam-Webster, Printed Sep. 27, 2021, 1 page https://www.merriam-webster.com/dictionary/HTML.

"HTML," Wikipedia, The Free Encyclopedia, Printed Sep. 27, 2021, 2 pages https://en.wikipedia.org/wiki/HTML.

"Markup Language," TechTerms; Printed Sep. 27, 2021, 1 page https://techterms.com/definition/markup_language.

"Markup Language," Merriam-Webster; Printed Sep. 27, 2021, 1 page https://www.merriam-webster.com/dictionary/markup%20language.

"Markup Language," Wikipedia, Printed Sep. 27, 2021, 1 page https://en.wikipedia.org/wiki/Markup_language.

* cited by examiner

REDUCED NETWORK FOOTPRINT CUSTOMER BEHAVIOR ANALYTICS

BACKGROUND OF THE INVENTION

Field of the Invention

The present invention relates to online user experience analytics and more particularly to user experience data capture in online user experience analytics.

Description of the Related Art

Online transactions and interactions make up a large part of the businesses of many organizations. As such, business organizations recognized the risk in choosing to ignore the online sales channel. Successful organizations continuously search for ways to optimize the online user experience to better serve customers and retain their competitive edge. One such way is through the use of online user experience analytics.

Online user experience analytics employ both qualitative and quantitative methods. Qualitative data is gathered through the observation of the end user so as to understand the way in which the end user interacts with a site. Quantitative data is garnered through analytics in identifying what actions end users take when end users visit a site and how many end users take those actions. This quantitative data allows the organization to measure a baseline, to use the baseline to inform design decisions for the site, and then measure the success or failure of the design.

With respect to the quantitative aspect of online user experience analytics, user experience data is captured as the end user interacts with an online site. By capturing data about the user experience, organizations may visualize behavior information of the end user that helps the organizations understand what works and what does not work. Utilizing the captured data, the user experience may be replayed at a later time for the benefit of the capturing organization. Replaying the experience of end users can assist organizations in the elimination of issues that might lead users to walk away from an online transaction, switch to another business or vent frustrations through social media.

The capturing of data pertaining to the end user experience in a site under study traditionally utilizes a technical process known as "DOM Capture and Replay". In DOM Capture and Relay, a document object model (DOM) of a Web page of the subject site with which an end user interacts is captured as a "snapshot". The DOM provides a structured representation of the Web page of the site. The DOM capture service captures the "snapshot" of the rendered DOM and sends the snapshot to the server as a message. The server then processes the DOM for browser based replay of the interactions of the end user. However, transmitting a sequence of DOMs for a multipage site can consume an inordinate amount of network bandwidth.

To address the undesirable consumption of network bandwidth during DOM Capture and Relay, an alternative technique of DOM-Diff is employed. DOM-Diff differs from ordinary DOM Capture and Relay in that in DOM-Diff, only a first full DOM is captured as a base DOM and sent to the analytical server over the network. Thereafter, only the differences with the base DOM are transmitted over the network to the analytical server and the full DOM is reconstructed for replay by combining the base DOM and the differences.

BRIEF SUMMARY OF THE INVENTION

Embodiments of the present invention address deficiencies of the art in respect to DOM capture and replay and provide a novel and non-obvious method, system and computer program product for reduced network footprint customer behavior analytics. In an embodiment of the invention, a method for reduced network footprint customer behavior analytics includes executing an analytics server in memory of a host computing system and loading into the memory a table. The table includes a multiplicity of entries, each entry correlating a reference to a DOM with a unique identifier and a Web browser brand. Thereafter, the analytics server performs DOM capture and replay of a Web site by receiving from over a computer communications network instead of a complete DOM, a message encapsulating both a unique identifier for a Web page of the Web site, and a Web browser brand rendering the Web page, identifying using the table a particular DOM referenced in correlation to the encapsulated unique identifier and Web browser brand, retrieving the particular DOM from a data store and performing replay utilizing the retrieved DOM.

In one aspect of the embodiment, the method additionally includes performing additional DOM capture and replay of a different Web page of the Web site by receiving from over the computer communications network difference data between a DOM for the different Web page and the particular DOM, reconstructing the DOM for the different Web page by combining the particular DOM with the difference data and performing replay utilizing the reconstructed DOM. In another aspect of the embodiment, each entry of the table also includes a Web browser version, and each message additionally encapsulates an identification of a version of the Web browser brand rendering the Web page. In yet another aspect of the embodiment, the encapsulated unique identifier is stored as a hidden parameter in markup of the Web page rendered in the Web browser. Finally, in even yet another aspect of the embodiment, the performance in the analytics server of DOM capture and replay of a Web site is deferred until a triggering event is detected in the Web server based upon actions by an end user with respect to one or more of the Web pages of the Web site.

In another embodiment of the invention, an analytics data processing system is configured for reduced network footprint customer behavior analytics. The system includes a host computing system with one or more computers, each with memory and at least one processor. The system also includes an analytics server executing in the memory of the host computing system. Finally, the system includes a reduced network footprint customer behavior analytics module coupled to the analytics server. The module includes program code that when executed in the host computing system loads into the memory a table comprising a multiplicity of entries, each entry correlating a reference to a document object model (DOM) with a unique identifier and a Web browser brand and performs in the analytics server DOM capture and replay for a Web site by receiving from over a computer communications network instead of a complete DOM, a message encapsulating both a unique identifier for a Web page of the Web site, and a Web browser brand rendering the Web page, identifying using the table a particular DOM referenced in correlation to the encapsulated unique identifier and Web browser brand, retrieving the particular DOM from a data store and performing replay utilizing the retrieved DOM.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for reduced network footprint customer behavior analytics. In accordance with an embodiment of the invention, a table is established in memory of a computer. Different entries for different DOMs are recorded in the table. Each entry correlates one of the different DOMs with a corresponding different unique identifier and a Web browser brand. Thereafter, when a Web page is to be served to an end user, the unique identifier corresponding to the DOM of the Web page is embedded in the Web page and the Web page is served to the end user. But, during DOM capture, the DOM for the Web page is not provided to the analytics server. Instead, only the unique identifier found in the Web page and an indication of the brand of the Web browser used by the end user to interact with the Web page is provided to the analytics server. The analytics server in turn retrieves the correct DOM from fixed storage in reference to the table based upon the received unique identifier and brand of Web browser. In this way, DOM capture and replay can occur without consuming an overly large network footprint.

Figure 1:
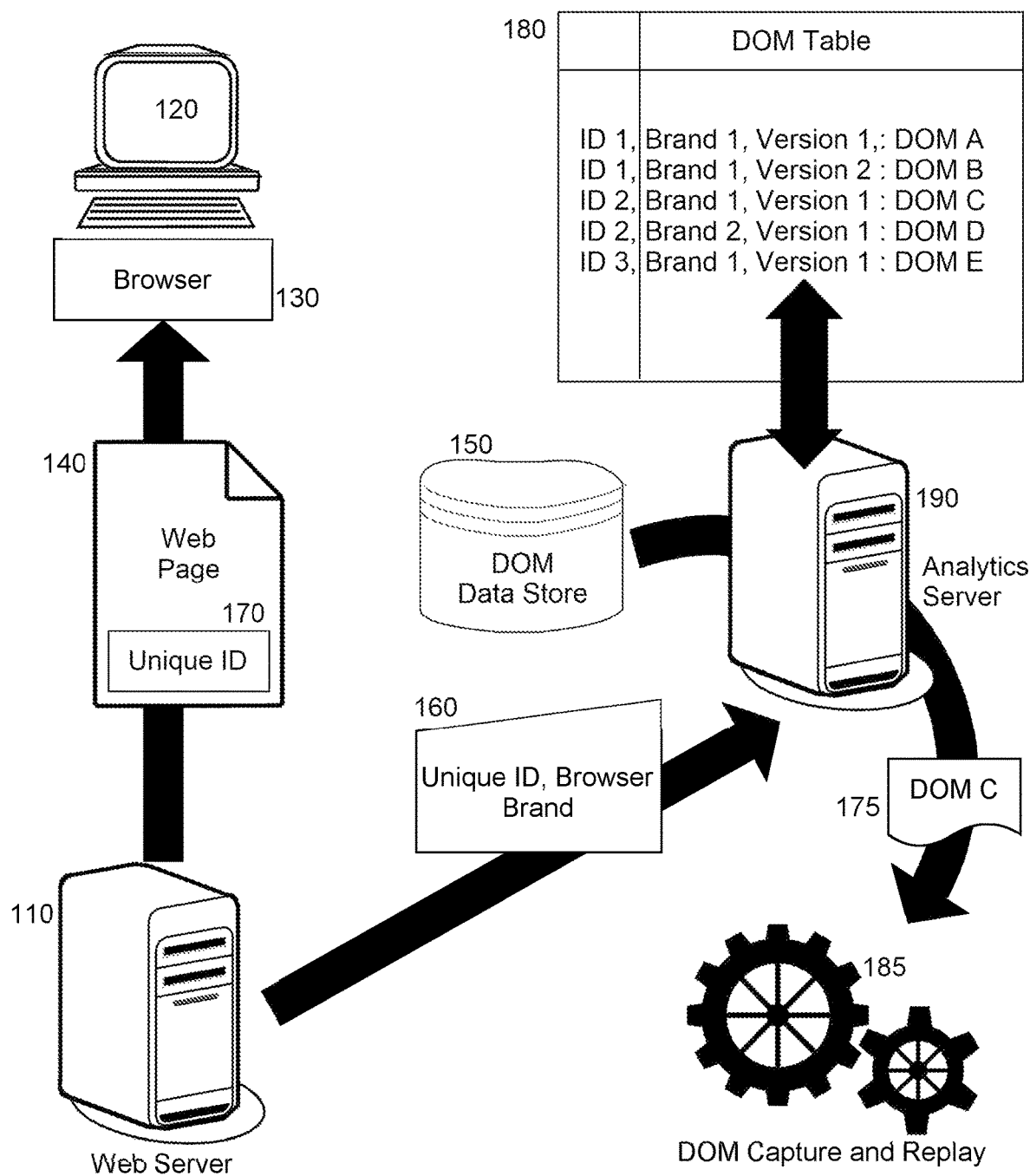
FIG. 1 is a pictorial illustration of a process for reduced network footprint customer behavior analytics.

In further illustration, FIG. 1 shows a process for reduced network footprint customer behavior analytics. As shown in FIG. 1, a Web server 110 responds to a request from a Web browser 130 in a client computer 120 for a request for a Web page 140 of a Web site by serving the Web page 140 to the client computer 120 for rendering in the Web browser 130. The Web page 140 of the Web site has embedded therein, a unique identifier 170. In response to transmitting the Web page 140 to the client computer 120, the Web server 110 concurrently transmits a message 160 to an analytics server 190 including not only the unique identifier 170 for the one of the Web pages 140, but also a brand of the Web browser 130 recognizable from the request initially sent by the Web browser 130 to the Web server 110.

The analytics server 190 upon receipt of the message 160 identifies both the unique identifier 170 in the message 160 along with the brand of the Web browser 130 and locates in a DOM table 180 a corresponding entry. Optionally, a version of the brand of the Web browser 130 may be provided with the message 160 and used by the analytics server 190 to locate the corresponding entry in the DOM table 180. The corresponding entry located in accordance with the unique identifier 170, the brand of the Web browser 130 and optionally the version of the brand of the Web browser 130 specifies a particular base DOM 175 disposed in DOM data stored 150. As such, the analytics sever 190 retrieves the base DOM 175 and utilizes the base DOM 175 during DOM capture and replay 185.

Figure 2:
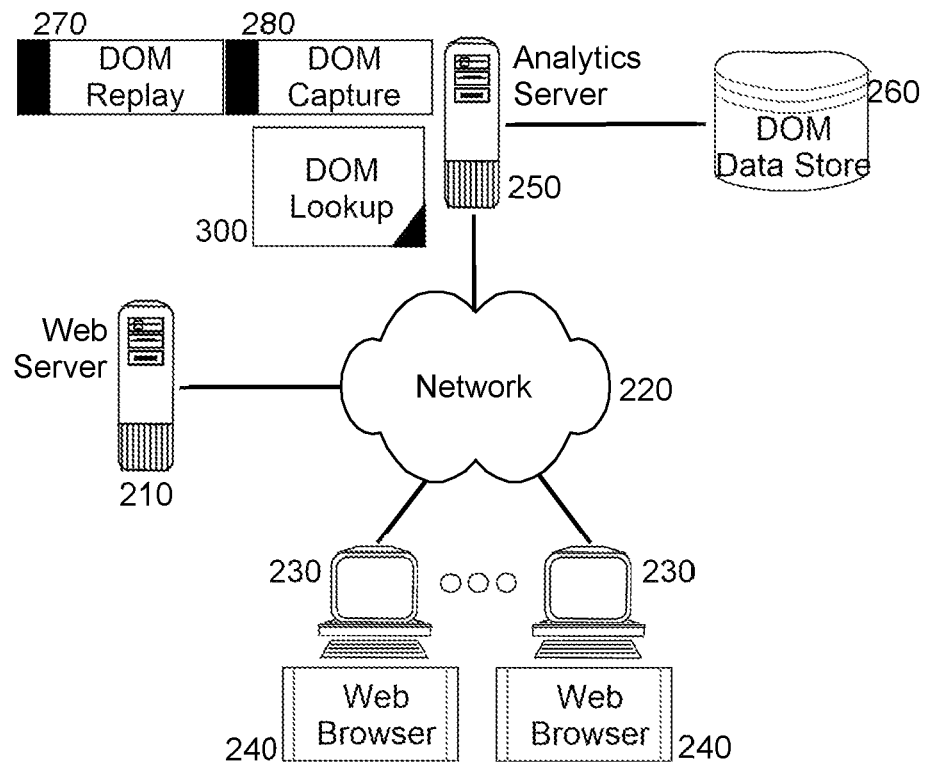
FIG. 2 is a schematic illustration of an analytics data processing system configured for reduced network footprint customer behavior analytics.

The process described in connection with FIG. 1 may be implemented in an analytics data processing system. In yet further illustration, FIG. 2 schematically shows an analytics data processing system configured for reduced network footprint customer behavior analytics. The system includes an analytics server 250 that includes one or more computers, each with memory and at least one processor and providing user experience analytics including DOM capture and replay based upon different DOMs stored in DOM data store 260. The analytics server 250 is communicatively coupled over computer communications network 220 to a Web server 210 serving Web pages of a Web site to different client computers 230 for rendering in respectively different Web browsers 240.

The analytics server 250, to perform DOM capture and replay, includes both DOM capture programmatic logic 280 and also DOM replay programmatic logic 270. The DOM capture programmatic logic 280 includes program instructions that when executed in the memory of the analytics server 250, captures DOMs for subsequent replay by the DOM replay programmatic logic 280, as corresponding Web pages are served by the Web server 210 to different ones of the clients 230 for viewing in the respectively different Web browsers 240. The DOM capture programmatic logic 280 in particular includes program instructions that when executed in the memory of the analytics server 250, establishes a base DOM for a Web page of a Web site, and reconstructs different DOMs for subsequent Web pages based upon the base form of the DOM utilizing difference data provided by the Web server 210.

Of note, a DOM lookup module 300 is coupled to the DOM capture programmatic logic 270. The DOM lookup module 300 includes program instructions that when executing in the memory of the analytics server 250, is enabled to receive from the Web server 210 a message indicating the service of a Web page to a Web browser 240 of a corresponding one of the client computers 230. The message includes a unique identifier for the Web page and also a brand of the Web browser 240 rendering the Web page. Optionally, the message includes a version of the brand of the Web browser 240. The program instructions of the module 300 additionally are enabled to use the unique identifier, brand, and optionally version, to locate a reference to a base DOM stored in the DOM data store 260. Finally, the program instructions of the module 300 during execution are enabled to deliver the base DOM to the DOM capture programmatic logic 270 for passage to the DOM replay programmatic logic 270 during DOM capture and replay.

Figure 3:
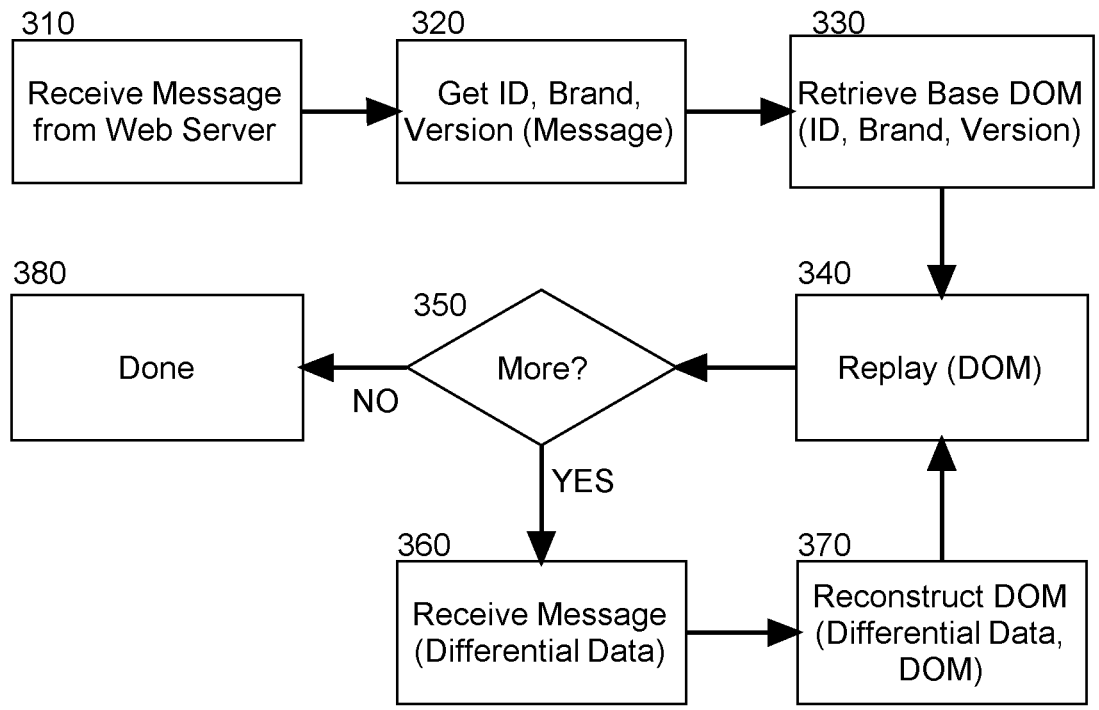
FIG. 3 is a flow chart illustrating a process for reduced network footprint customer behavior analytics; and, FIG. 4 is a flow chart illustrating a process for reduced network footprint customer behavior analytics utilizing triggered uploading of DOMs.

In even yet further illustration of the operation of the DOM lookup module 300, FIG. 3 is a flow chart illustrating a process for reduced network footprint customer behavior analytics. Beginning in block 310, a message is received from a Web server 310 in response to the service by the Web server of a Web page of a Web site subject to user experience analytics. In block 320, a unique identifier, Web browser brand and version of the brand can be extracted from the message. In block 330, a base DOM is retrieved from a DOM data store based upon the unique identifier, Web browser brand and version. Thereafter, in block 340, the base DOM is used during DOM replay.

In decision block 350, it is determined if additional Web pages of the Web site are served to the Web browser. If so, in block 360 a message is received from the Web server encapsulating differential data describing the differences between the base DOM and a DOM associated with the newly served additional Web page. In block 370, the differential data is used to reconstruct the DOM of the newly served additional Web page and the reconstructed DOM is replayed in block 340. When no further Web pages of the Web page are served to the Web browser, the process ends in block 380.

Figure 4:
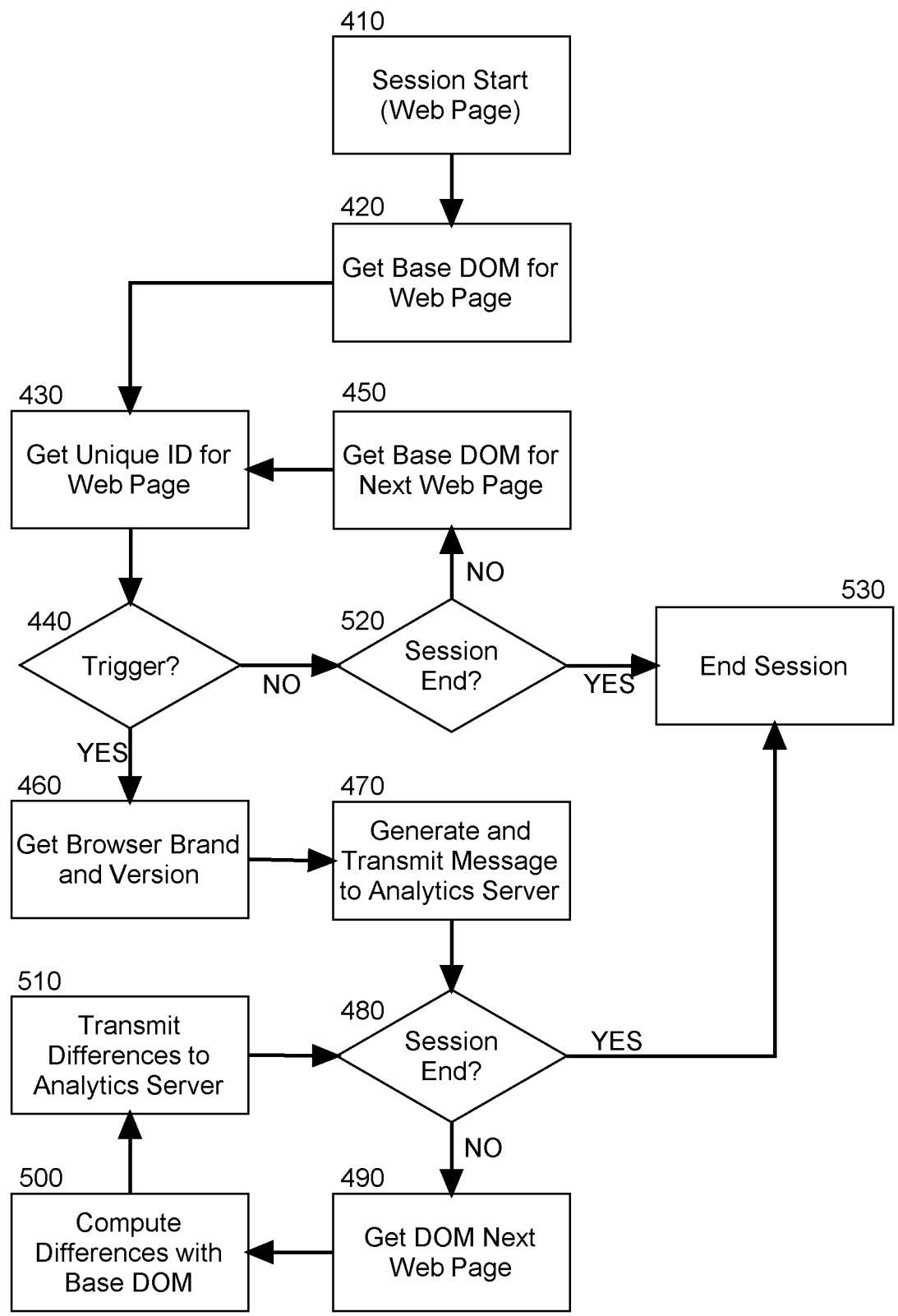

Of note, it is to be recognized that acquiring analytics for all Web site sessions during which an end user interacts with a Web site may not be of interest as only certain circumstances call for the replay of a customer session. Thus, computing resources and especially network bandwidth may be further conserved by only triggering the uploading of captured DOMs from the Web server to the analytics server in response to certain events of interest. In even yet further illustration, FIG. 4 is a flow chart illustrating a process for reduced network footprint customer behavior analytics utilizing triggered uploading of DOMs. Beginning in block 410, a session can begin in which an end user interacts with a first Web page of a Web site subject to analytics. In block 420, a first, base DOM can be captured for the Web page and in block 430, a unique identifier for the Web page extracted, but messaging the unique ID to the analytics server may be deferred.

More specifically, in decision block 440, it is determined whether or not a triggering event has occurred. A triggering event can include any user interface event previously established for the Web site such as an act of canceling a transaction, selecting a "back" button to return to a previously viewed Web page or the repeating of a threshold number of the same operations in a single Web page, to name a few examples. If, in decision block 440 it is determined that a triggering event has not occurred, in decision block 520 it is determined if the session has ended. If so, the process ends in block 530. But otherwise, in block 450 a base DOM for a next selected Web page is retrieved and in block 430, a unique identifier for the Web page is again extracted from the Web page.

In decision block 440, it is again determined if a triggering event has occurred. If so, in block 460 a browser brand and version of the browser is determined for the browser rendering the Web page. In block 470, a message is generated to include the unique identifier for the Web page, the browser brand and the browser version and the message is transmitted to the analytics server. In decision block 480, it is determined if the session has now ended. If so, the process ends in block 530. But otherwise, in block 490 a next DOM for a next Web page is retrieved and in block 500, the differences between the next DOM and the base DOM are computed with only those differences transmitted to the analytics server in block 510. Then, in decision block 480, it is again determined if the session has ended. If so, in block 530 the process ends.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for reduced network footprint customer behavior analytics in an analytics server, the method comprising:
   loading into a memory of the analytics server a table comprising a multiplicity of entries, wherein each entry correlates a reference to a document object model (DOM) with a unique identifier of a Web page and a Web browser brand;
   performing DOM capture of a Web site of different Web pages served by a Web server, the performing DOM capture comprising:
      receiving, from the Web server, a message comprising a particular unique identifier of a first Web page visited by an end user and a particular Web browser brand used by the end user;
      identifying, using the table and in response to receiving the message, a base DOM that corresponds to the particular unique identifier of the first Web page and the particular Web browser brand;
      retrieving, in response to the identifying, the base DOM from a data store;
      and reconstructing, using the retrieved base DOM, a full DOM for replay; and
   performing replay utilizing the reconstructed full DOM.

2. The method of claim 1, wherein reconstructing the full DOM comprises:
   detecting that a second Web page of the Web site is served to the end user after the first Web page;
   receiving from over the computer communications network difference data between a DOM for the second Web page and the base DOM; and
   reconstructing the DOM for the second Web page by combining the base DOM with the difference data.

3. The method of claim 1, wherein each entry of the table also includes a Web browser version, and the message additionally encapsulates an identification of a version of the particular Web browser brand rendering the Web page.

4. The method of claim 1, wherein the particular unique identifier is stored as a hidden parameter in markup of the first Web page rendered in the Web browser.

5. The method of claim 1, wherein the performing DOM capture of a Web site is deferred until a triggering event is detected in the Web server based upon actions by an end user with respect to one or more of the Web pages of the Web site.

6. An analytics data processing system configured for reduced network footprint customer behavior analytics, the system comprising:
   an analytics server comprising one or more computers, each with memory and at least one processor; and
   an analytics server memory coupled to the analytics server, the analytics server memory comprising program code that when executed in the analytics server, causes the analytics server to:
      load into the analytics server memory a table comprising a multiplicity of entries, wherein each entry correlates a reference to a document object model (DOM) with a unique identifier of a Web page and a Web browser brand;
      perform DOM capture for a Web site of different Web pages served by a Web server, the performing DOM capture comprising:
         receiving, from the Web server, a message comprising a particular unique identifier of a first Web page visited by an end user and a particular Web browser brand used by the end user;
         identifying, using the table and in response to receiving the message, a base DOM that corresponds to the particular unique identifier of the first Web page and the particular Web browser brand;
         retrieving, in response to the identifying, the base DOM from a data store; and
         reconstructing, using the retrieved base DOM, a full DOM for replay; and
      perform replay utilizing the reconstructed full DOM.

7. The system of claim 6, wherein reconstructing the full DOM comprises:
   detecting that a second Web page of the Web site is served to the end user;
   receiving from over the computer communications network difference data between a DOM for the second Web page and the base DOM; and
   reconstructing the DOM for the second Web page by combining the base DOM with the difference data.

8. The system of claim 6, wherein each entry of the table also includes a Web browser version, and the message additionally encapsulates an identification of a version of the Web particular browser brand rendering the Web page.

9. The system of claim 6, wherein the particular unique identifier is stored as a hidden parameter in markup of the first Web page rendered in the Web browser.

10. The system of claim 6, wherein the performing DOM capture of a Web site is deferred until a triggering event is detected in the Web server based upon actions by an end user with respect to one or more of the Web pages of the Web site.

11. A computer program product for reduced network footprint customer behavior analytics, the computer program product comprising a computer readable storage medium having program instructions embodied therewith, wherein the computer readable storage medium is not a transitory signal per se, the program instructions executable by an analytics server to cause the analytics server to perform a method comprising:
   loading into a memory of the analytics server a table comprising a multiplicity of entries, wherein each entry correlates a reference to a document object model (DOM) with a unique identifier of a Web page and a Web browser brand;
   performing DOM capture of a Web site of different Web pages served by a Web server, the performing DOM capture comprising:
      receiving, from the Web server, a message comprising a particular unique identifier of a first Web page visited by an end user and a particular Web browser brand used by the end user;
      identifying, using the table and in response to receiving the message, a base DOM that corresponds to the particular unique identifier of the first Web page and the particular Web browser brand;
      retrieving, in response to the identifying, the base DOM from a data store;
      and reconstructing, using the retrieved base DOM, a full DOM for replay; and
   performing replay utilizing the reconstructed full DOM.

12. The computer program product of claim 11, wherein reconstructing the full DOM comprises:
   detecting that a second Web page of the Web site is served to the end user;
   receiving from over the computer communications network difference data between a DOM for the second Web page and the base DOM; and
   reconstructing the DOM for the second Web page by combining the base DOM with the difference data.

13. The computer program product of claim 11, wherein each entry of the table also includes a Web browser version, and the message additionally encapsulates an identification of a version of the particular Web browser brand rendering the Web page.

14. The computer program product of claim 11, wherein the particular unique identifier is stored as a hidden parameter in markup of the first Web page rendered in the Web browser.

15. The computer program product of claim 11, wherein the performing DOM capture of a Web site is deferred until a triggering event is detected in the Web server based upon actions by an end user with respect to one or more of the Web pages of the Web site.

* * * * *